UNITED STATES PATENT OFFICE.

RUBIN BLANK, OF BERLIN, GERMANY, ASSIGNOR TO LEOPOLD CASSELLA & CO., OF FRANKFORT-ON-THE-MAIN, GERMANY.

AMIDO MALONIC ESTER AND PROCESS OF MAKING SAME.

SPECIFICATION forming part of Letters Patent No. 620,562, dated March 7, 1899.

Application filed September 22, 1896. Serial No. 606,617. (Specimens.)

*To all whom it may concern:*

Be it known that I, RUBIN BLANK, a subject of the Emperor of Germany, residing at Frankfort-on-the-Main, in the Empire of Germany, have invented a certain new and useful Improvement in Processes of Manufacturing Dyestuffs of the Indigo Series and in the Products Produced Thereby; and I do hereby declare the following to be a full, clear, and exact description of the invention, such as will enable others skilled in the art to which it appertains to make and use the same.

I have discovered that on allowing the aromatic amins to act upon bromo or chloro malonic acid esters aromatic amido malonic acid esters are produced. These compounds are of great practical utility in that they readily lend themselves to the formation of indoxylic compounds, which may be readily converted into compounds of the indigo series. The chemical reaction may be explained by the following equation:

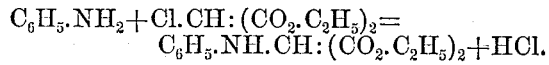

$$C_6H_5.NH_2 + Cl.CH:(CO_2.C_2H_5)_2 = C_6H_5.NH.CH:(CO_2.C_2H_5)_2 + HCl.$$

*Example 1. Anilido malonic acid ester.*—Ten (10) parts, by weight, of monobromomalonic acid ethyl ester (one molecule) are mixed with seven and eight-tenths (7.8) parts anilin, (two molecules.) This mixture thickens immediately, and a separation of crystals begins soon after. The mixture is allowed to stand for one or two days until the liquid is almost wholly congealed, or the same result may be obtained by heating the mixture for about two hours in a water-bath. About fifty (50) parts of water and five (5) parts of hydrochloric acid of 21° Baumé are then added and the whole is well shaken. The hydrochlorate of anilin thus formed dissolves, and the anilidomalonic acid ester precipitates in the form of an oil. The aqueous solution of the hydrochlorate of anilin is now decanted and the oil residue aforesaid is cooled, when it congeals after some time. The crystals thus formed are filtered, washed with water, and pressed. The said crystals may be purified by dissolving the above impure crystals in alcohol and precipitating by the addition of water to this solution. These crystals are the anilidomalonic acid ester and are colorless or of a slight reddish tint, melting at a temperature of 45° centigrade, and are easily soluble in almost any of the ordinary organic dissolving agents.

*Example 2. Paratoluidomalonic acid ester.*—Nine (9) parts, by weight, of paratoluidin are dissolved in alcohol, and to this solution ten (10) parts, by weight, of bromomalonic acid ester are added. The remainder of the operation is carried out in the same manner as for the formation of the anilidomalonic acid ester described under Example 1. The paratoluidomalonic acid ester crystallizes in large colorless crystals, melting at a temperature of 55° centigrade. They are easily soluble in almost any of the ordinary organic dissolving agents.

*Example 3. Betanaphtylamidomalonic acid ester.*—Twelve (12) parts, by weight, naphtylamin are dissolved in hot alcohol, and to this solution ten (10) parts of bromomalonic acid ester are added and the mixture heated for about two hours in a water-bath. After cooling three parts hydrochloric acid are added to the solution, which is well shaken and the ester precipitated by the addition of a small amount of water. By dissolving the ester in alcohol and precipitating by the addition of water white felt-like crystals of the ester are obtained, melting at a temperature of 88° centigrade, and which are easily soluble in almost any of the ordinary organic dissolving agents.

Chloromalonic acid esters may be substituted for the bromic compounds in any of the above examples, but the duration of the reaction must be somewhat increased.

Having thus described my invention and in what manner it can be performed, what I claim as new, and desire to secure by Letters Patent, is—

1. The within-described process of producing aromatic amido malonic acid esters by allowing aromatic amins to react upon halogen malonic acid esters, substantially as described.

2. As new products the amidomalonic acid esters having the formula

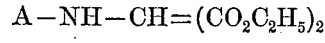
$$A-NH-CH=(CO_2C_2H_5)_2$$

where $A-NH_2$ represents an aromatic amin, one H of which is substituted by the malonic acid ester root, which are derived from aromatic amins and halogen malonic acid esters, being colorless substances insoluble in water, soluble in spirit or benzene, which cannot be distilled without decomposition being transformed at high temperatures into derivatives of indoxylic acid esters, substantially as described.

In testimony whereof I have signed my name to this specification in the presence of two subscribing witnesses.

RUBIN BLANK.

Witnesses:
AUGUST MÜHLE,
A. VOGT.